United States Patent
Comer et al.

(10) Patent No.: US 10,403,047 B1
(45) Date of Patent: Sep. 3, 2019

(54) INFORMATION HANDLING SYSTEM AUGMENTED REALITY THROUGH A VIRTUAL OBJECT ANCHOR

(71) Applicant: Dell Products L.P., Round Rock, TX (US)

(72) Inventors: Ryan N. Comer, Austin, TX (US); Yagiz C. Yildiz, Austin, TX (US); Anantha K. Boyapalle, Cedar Park, TX (US); Jace W. Files, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 21 days.

(21) Appl. No.: 15/909,108

(22) Filed: Mar. 1, 2018

(51) Int. Cl.
| | |
|---|---|
| *G09G 5/00* | (2006.01) |
| *G06T 19/00* | (2011.01) |
| *G06K 9/00* | (2006.01) |
| *G06F 3/01* | (2006.01) |
| *H04L 29/06* | (2006.01) |

(52) U.S. Cl.
CPC ............ *G06T 19/006* (2013.01); *G06F 3/012* (2013.01); *G06K 9/00671* (2013.01); *G06T 2219/024* (2013.01); *H04L 67/38* (2013.01)

(58) Field of Classification Search
CPC .................................................. G06T 19/006
USPC ......................................................... 345/633
See application file for complete search history.

(56) References Cited

PUBLICATIONS

Huaming Rao et al., Combining Schematic and Augmented Reality Presentations in a Remote Spatial Assistance System, Computer-Human Interaction, Cognitive Effects of Spatial Interaction, Learning, and Ability, LNCS, pp. 153-170, http://cascade.cs.illinois.edu/publication/rao2013cimer.pdf.

*Primary Examiner* — Javid A Amini
(74) *Attorney, Agent, or Firm* — Zagorin Cave LLP; Robert W. Holland

(57) ABSTRACT

A virtual object anchor stores an offset in memory that defines a virtual object position, orientation and scale relative to the location of the virtual object anchor. Information handling systems retrieve and apply the offset to generate a virtual object in a head mounted display that is presented at a location relative to the virtual object defined by the offset. In one embodiment, gestures detected by information handling system sensors that change the position, orientation or scale of the virtual object are applied to update the offset and communicated for storage at the virtual object anchor. In another embodiment, gestures detected by sensors of the virtual object anchor are applied to update the offset so that the updated offset is communicated to the information handling systems for presentation of the virtual object at an updated position, orientation and/or scale determined from the gestures.

16 Claims, 7 Drawing Sheets

INFORMATION HANDLING SYSTEM AUGMENTED REALITY THROUGH A VIRTUAL OBJECT ANCHOR

BACKGROUND OF THE INVENTION

Field of the Invention

The present invention relates in general to the field of information handling system visual information presentation, and more particularly to an information handling system augmented reality through a virtual object anchor.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems often process information to present the information at a display as a visual image. Typically information handling systems include graphics systems that process visual information into pixel values that define an image at a display. Conventional information handling systems typically interface with flat panel displays that present the visual information as two dimensional visual objects. Enterprises that do design work often use information handling systems with powerful processing capabilities and graphics chips to rapidly process and present complex visual information. For example, computer aided design (CAD) applications define a product, building or other designed object in software and then render the object as a visual image that an end user can manipulate, such as by changing the object's orientation or peeling back layers of the object to view structures under the object. CAD applications greatly simplify design work by aiding end user visualization of the designed object before prototypes are built.

Recently, head mounted displays have entered enterprise work places as a tool to help designers visualize designed objects. Head mounted displays generally operate by projecting an image within head gear worn by an end user and in front of the end user's eyes. Head mounted displays can project the designed object in three dimensions to appear as if the object is in space at a location in front of the end user. An engineer wearing a head mounted display can view a three dimensional image of a designed object within arm's length and then reach out and manipulate the designed object with gestures, such as grasping at the projected location of the three dimensional image. Head mounted displays generally work in a virtual reality or an augmented reality. Virtual reality images are presented against a darkened background so that the end user views just the displayed virtual reality. Augmented reality images are presented against an opening that lets the end user see the "real" world in front of him while projecting the three dimensional image against the real world background. Thus, for example, an end user manipulating a virtual object in virtual reality cannot directly view his hands during the manipulation; in contrast, an end user manipulating a virtual object in augmented reality can view his hands as they touch and gesture relative to the virtual object. Augmented reality tends to provide a more intuitive interaction with end user gestures.

Often enterprise designers collaborate on design projects with different individuals making different contributions to the design. A difficulty with augmented reality in a collaborative environment is that each end user has his own three dimensional virtual object presented through his own head mounted display. Thus, a "real-life" collaboration when end users each wear their own head mounted display does not generally involve coordinated presentation of the virtual object so that end users interact at the same virtual object location. Efforts in industry to implement collaborative solutions for augmented reality that let each end user work on the same virtual object generally attempt to merge and synchronize the "virtual spaces" of separate head mounted displays using inside-out tracking data. Head mounted display tracking for collaboration purposes has limitations in distance accuracy, field of view, processing power and user tracking.

SUMMARY OF THE INVENTION

Therefore, a need has arisen for a system and method which provides information handling system augmented reality through a virtual object anchor.

In accordance with the present invention, a system and method are provided which substantially reduce the disadvantages and problems associated with previous methods and systems for collaborating between multiple users interacting with an augmented reality object. A virtual object anchor stores an offset that defines a virtual object position, orientation and scale relative to a position of the virtual object anchor. Information handling systems retrieve the offset an apply the offset to generate a virtual object in a head mounted display at a location relative to the virtual object anchor defined by the offset.

More specifically, a virtual object anchor integrates a processor, memory, network interface device and sensors in a portable housing configured to rest on a desktop surface. Instructions stored in non-transitory memory of the virtual object anchor execute on the processor to store an offset that defines a position, orientation and scale of a virtual object relative to the housing and that communicates the offset to information handling systems proximate the object. Information handling systems apply the offset to generate a three dimensional visual image of a virtual object in a head mounted display at a location defined by the offset. As an information handling system detects gestures of an end user that change the virtual object's presentation, the information handling system updates the offset and communicates the updated offset to the virtual object anchor. The virtual object anchor stores the updated offset and communicates the updated offset to other information handling systems so that the other information handling systems render the virtual object as updated by the gestures. Alternatively, sensors integrated in the virtual object anchor detect gestures at the position defined by the offset and apply the detected gestures to update the offset so that information handling systems can retrieve the updated offset and render the virtual object against a common coordinate system. In one embodiment, position information determined to a head mounted display by sensors of the virtual object anchor is compared with position information determined to the virtual object anchor by sensors of the head mounted display to calibrate the presentation position of the virtual object.

The present invention provides a number of important technical advantages. One example of an important technical advantage is that a virtual object presented at a head mounted display correlates in its relative physical position to virtual objects of other head mounted displays so that end users wearing the head mounted displays can collaborate with interactions at the virtual objects. The location of the virtual object is defined by offset values stored in a physical device, referred to herein as the virtual object anchor, that each head mounted display retrieves. Each head mounted display then applies the offset and the head mounted display's position relative to the virtual object anchor to determine a location of the virtual object, and presents the virtual object at the determined location. As an end user interacts with the virtual object, changes made to the presentation of the virtual object are stored locally on the virtual object anchor with updated offset information that allows other head mounted displays to match the virtual object's relative position. In one embodiment, multiple virtual object anchors cooperate through networked communications so that the virtual object anchors at different physical locations coordinate the relative positioning of the virtual object.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A virtual object anchor coordinates presentation of a virtual object by plural information handling systems through plural head mounted displays by storing an offset of the virtual object's position relative to the virtual object anchor and providing the offset to the plural information handling systems. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
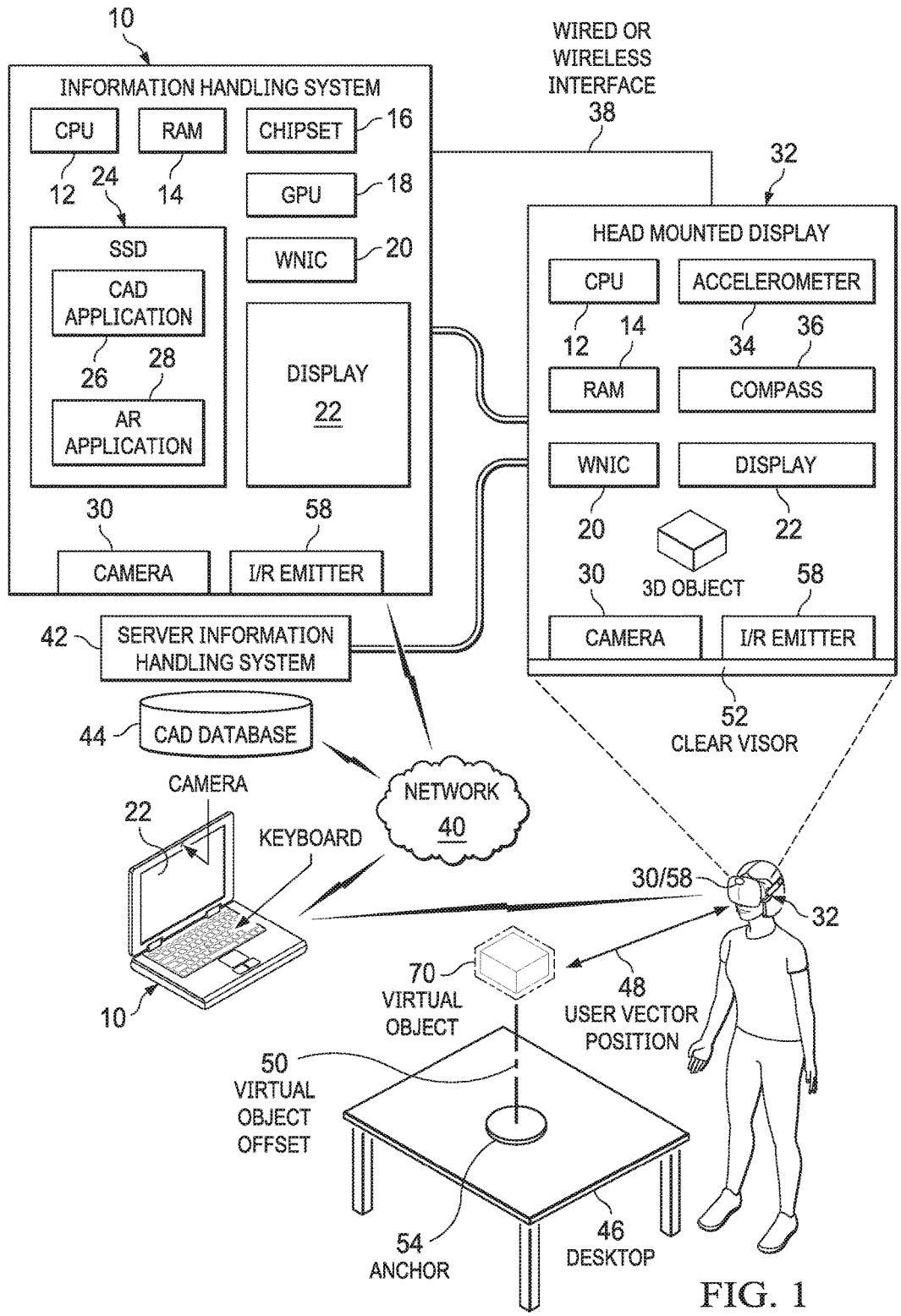
FIG. 1 depicts a block diagram of an information handling system and virtual object anchor that coordinate presentation of a virtual object through plural head mounted displays.

Referring now to FIG. 1, a block diagram depicts an information handling system 10 and virtual object anchor 54 that coordinate presentation of a virtual object 70 through plural head mounted displays 32. In the example embodiment, information handling system 10 processes information by executing instructions on a central processing unit (CPU) 12. For instance, CPU 12 executes instructions of an operating system and applications that are stored in random access memory (RAM) 14, such as to generate visual information for presentation to an end user based upon inputs made by the end user. A chipset 16 interfaces with CPU 12 to coordinate interactions with input/output (I/O) devices, such as a keyboard and mouse. A graphics processor unit (GPU) 18 interfaces with CPU 12 to accept visual information and process the visual information into pixel values that render a visual image at a display 22, such as a flat panel display integrated in a portable housing with CPU 12. A wireless network interface card (WNIC) 20 interfaces with CPU 12 to communicate with external devices, such as through WiGiG, Bluetooth or other wireless protocols. A solid state drive (SSD) 24 or other similar persistent storage device stores information and applications at information handling system 10 during power-off time periods. In the example embodiment, a CAD application 26 and augmented reality (AR) application 28 retrieved to RAM 14 support end user interactions with designed objects through head mounted displays 32 as described in greater detail below. A camera 30 senses end user actions, such as in cooperation with infrared emitters to operate as a depth camera. Other sensors may be used to send end user actions, such as an ultrasonic sensor that uses Doppler effects to detect end user gestures. Information handling system 10 depicts one example configuration of processing components that cooperate to process information and other configurations may be used.

In the example embodiment, information handling system 10 interfaces with a head mounted display 32 that rests on an end user head to present visual images as three dimensional objects as the end user views real objects through a clear visor 52. In the example embodiment, head mounted display 32 has a CPU 12 that executes instructions stored in RAM 14 to coordinate presentation of visual images, such as operating code retrieved by CPU 12 to RAM 14 from non-transient flash memory. Head mounted display 32 includes a wireless network interface card 20 that communicates through a wireless or wired (e.g. HDMI, USB, DP) interface 38 to information handling system 10, such as to retrieve visual information to present as visual images at display 32. Display 32 is, for instance an LCD projector integrated in head mounted display 32 presents a three dimensional object to appear as a virtual object 70 at a location beyond the clear visor 52, such as at an arm's reach of the end user. Head mounted display 32 includes one or more accelerometers to detect motion, such as configured as an inertial motion detector that senses orientation. Head mounted display 32 includes a magnetic compass 36 that provides a reference axis, such as true north. Various sensors, such as depth camera 30 or ultrasonic sensor, integrated in head mounted display 32 detect objects, such as end user hands that perform gestures. For example, an end user viewing a virtual object 70 can reach with hands to make a rotational movement at object 70 that is detected by depth camera 30. The detected gestures are then communicated to information handling system 10 where augmented reality application 28 and GPU 18 cooperate to adapt the presentation of virtual object 70 to reflect the gesture. In an alternative embodiment, information handling system 10 may be integrated into head mounted display 32 to process and present a virtual object as a contiguous unit.

In order to coordinate presentation of virtual object 70 for multiple end users, a virtual object anchor 54 placed on desktop 46 locally stores a virtual object offset 50 that defines a presentation location, orientation and scale for virtual object 70. Virtual object anchor 54 is a physical object that provides a physical reference point for presentation of a virtual object. For example, the offset is nine data points per frame, including three for position, three for rotation and three for scale. The nine data points describe the virtual object's location in space relative to virtual object anchor 54 so that an information handling system 10 that knows virtual object anchor 54's position and rotation along with the offset can render virtual object 70 relative to virtual object anchor 54 in common with other information handling system's 10. In the example embodiment, two separate information handling systems 10 render virtual object 70 for two separate end user head mounted displays 32. Each information handling system 10 retrieves the same offset from virtual object anchor 54, such as with a Bluetooth interface between each information handling system 10 and virtual object anchor 54. Each head mounted display 32 includes sensors that define a user position vector 48 from the head mounted display 32 to virtual object anchor 54. Once a virtual object 70 offset 50 and user position vector 48 are known to augmented reality application 28, augmented reality application 28 cooperates with GPU 18 to render virtual object 70 in head mounted display 32 to have a common location presentation across multiple head mounted displays 32. For example, each end user sees virtual object 70 in a position, orientation and scale fixed relative to virtual object anchor 54. For instance, end user's located at opposite sides of virtual object 70 will see opposite sides of virtual object 70. Although FIG. 1 depicts a single virtual object 70, in alternative embodiments, multiple virtual objects may be defined by multiple offsets 50 for presentation of multiple virtual objects at desktop 46.

In the example embodiment, virtual object 70 has presentation bifurcated across two or more databases. Information handling systems 10 interface through a network 40 with a server information handling system 42 that has a CAD database 44 that stores a CAD model of virtual object 70. A CAD application 26 on each information handling system 10 retrieves the model from CAD database 44 to render the model with GPU 18 as a three dimensional visual image for presentation by a head mounted display 32. Augmented reality application 28 adjusts the presentation position, orientation and scale based upon virtual object offset 50 to render the image in a fixed location relative to virtual object anchor 54. If the end user alters virtual object 70's position, orientation and/or scale with a gesture, an update to offset 50 is determined based upon the end user interaction and stored to virtual object anchor 54 so that all end user's viewing virtual object 70 can retrieve the updated offset and render virtual object 70 with updated position, orientation and scale based upon the detected gestures. Bifurcation of model and offset data provides a powerful collaboration tool. For example, an end user may elect to manipulate virtual object 70 without storing an updated offset so that the end user can consider alternative views alone, and then update offset 50 when ready to share with others. At any time, all end users viewing virtual object 70 may share a common view rendered at each head mounted display 32 by retrieving offset 50 from memory of virtual object anchor 54 and applying offset 50 with user position vector 48 to render virtual object 70. In alternative embodiments, CAD database 44 may be collocated with offset information, such as at the same server information handling system or stored in virtual object anchor 54. For example, virtual object anchor 54 may itself include resources to act as a server information handling system and/or a data storage server that has memory and network bandwidth sufficient to support communication of a CAD model to client information handling systems for presentation at head mounted displays.

Figure 2:
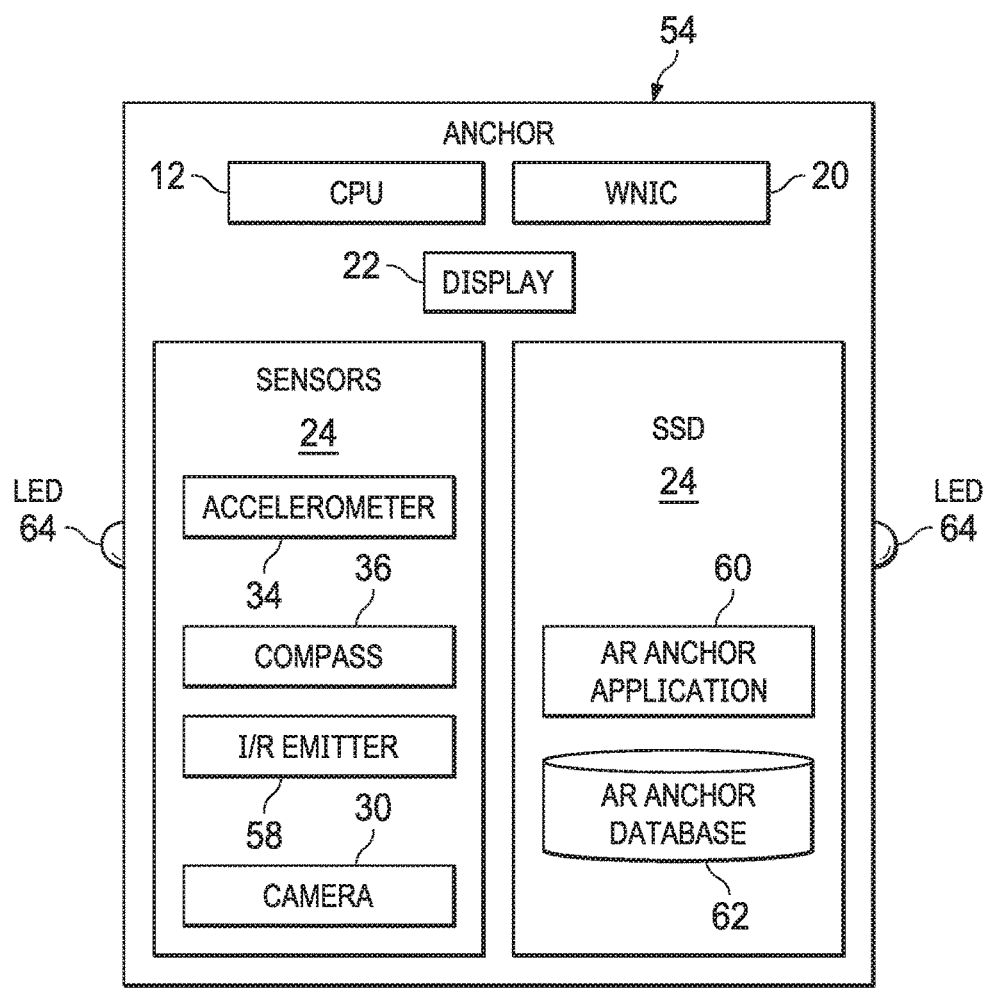
FIG. 2 depicts a block diagram of a virtual object anchor that stores a virtual object offset defining position, orientation and scale of a virtual object.

Referring now to FIG. 2, a block diagram depicts a virtual object anchor 54 that stores a virtual object offset 50 defining position, orientation and scale of a virtual object. In the example embodiment, virtual object anchor 54 includes a CPU 12, such as an ARM processor, that executes an augmented reality application 60 stored in an SSD 24 or other non-transient memory. Augmented reality application 60 stores offset information for one or more virtual objects in an augmented reality database 62. Virtual object anchor 54 has a wireless interface device, such as a Bluetooth WNIC 20, to communicate with information handling systems 10 and/or head mounted displays 32. Sensors 56 integrated in virtual object anchor 54 interface with CPU 12 to determine virtual object anchor 54's position, orientation and movements. In the example embodiment, accelerometers 34 detect motion and rotation of virtual object anchor 54, such as with inertial logic that senses accelerations and gyroscopic forces across plural axes. A compass 36 provides a reference to true north so that offset 50 is defined relative to geographic feature that head mounted displays and information handling systems can separately detect. Alternatively or in combination with compass 36, virtual object anchor 54 has LEDs 64 or other visual reference points that provide a visual indication of a common axis relative to offset 50. For instance, illumination of an LED acts as the X-axis relative to the center of virtual object anchor 54 that a head mounted display 32 can sense with a camera and apply to offset 50 to determine orientation for rendering virtual object 70. An infrared emitter 58 and camera 30 integrated in virtual object anchor 54 provides virtual object anchor 54 to sense external conditions, such as end user gestures made at a location of virtual object 70 as set forth below. In alternative embodiments, alternative sensors may be included, such as ultrasonic sensors that use Doppler effects to detect motion like gestures made at a virtual object 70 offset relative to virtual object anchor 54. Further alternative network interfaces may be included, such as WiGiG and wired interfaces, or a USB interface established through an information handling system. In one alternative embodiment, a display 22 integrated in virtual object anchor 54, such as an OLED, LED or LCD, presents visual information detectable by head mounted displays, such as non-symmetrical identifier that identifies a compass or other orientation of virtual object anchor 54.

Advantageously, storage and sensors integrated in virtual object anchor 54 provide flexible interactions with multiple information handling systems for presenting a common virtual object and manipulating that object. Storing a virtual object offset in memory of virtual object anchor 54 lets multiple information handling systems retrieve the offset information an present the virtual object at a common coordinate system referenced to virtual object anchor 54, such as true north or a visually distinct marking on virtual object anchor 54. In one embodiment, information handling systems retrieve the offset as needed, such as at regular intervals or upon receiving an alert that the offset has changed. For example, if one end user makes a gestured detected by the end user's sensors, the end user's information handling system communicates an updated offset to virtual object anchor 54 for storage in memory. The information handling system may alert collaborating information handling systems of the change or, alternatively, virtual object anchor 54 may broadcast an alert that an updated offset is available for download. In one embodiment, virtual object anchor 54 may broadcast the offset at regular intervals, such as with a Bluetooth beacon, so that any information handling system in range get the offset by listening to the broadcast. In an alternative embodiment, sensors 56 of virtual object anchor 54 detect end user gestures, compute an updated offset based upon the detected gestures, and provide the updated offset to the information handling to apply in rendering the virtual object. As is set forth below in greater detail, sensors 56 also provide a way to calibrate end user presentation and gesture input by measuring the relative position of head mounted displays in proximity to virtual object anchor 54.

Figure 3:
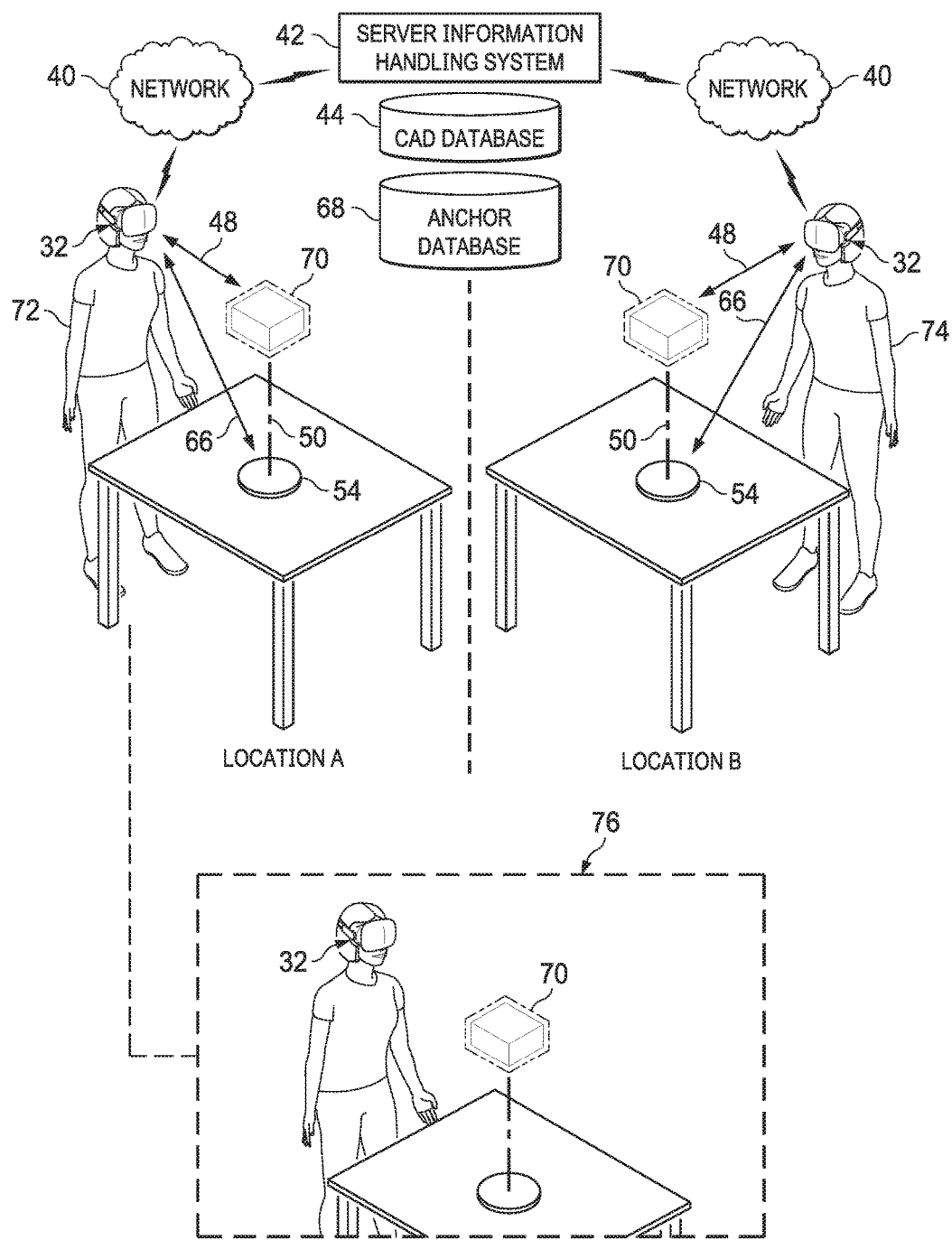
FIG. 3 depicts an example embodiment of collaboration between multiple head mounted displays that present a virtual object coordinated by multiple virtual object anchors.

Referring now to FIG. 3, an example embodiment depicts collaboration between multiple head mounted displays that present a virtual object coordinated by multiple virtual object anchors 54. In the example embodiment, virtual object anchors 54 at locations A and B interface through a network 40 and server information handling system 42 to coordinate presentation of a virtual object 70 in a collaborative environment at both locations. Each virtual object anchor 54 locally stores an offset and communicates updates to an virtual object anchor database 68 so that both virtual object anchors 54 synchronize the offset, such as with a server push to each virtual object anchor 54 as updates are made at other virtual object anchors 54. In addition, virtual object anchor 54 stores a location, such as in offset form, of each end user sensed proximate each virtual object anchor 54. Thus, in the example embodiment, an end user 72 at location A sees a front view of virtual object 70 based upon an offset retrieved from virtual object anchor 54 at location A and a vector sensed from end user 72 to virtual object anchor 54. At the same time, end user 74 located at location B views a left side of virtual object 70 based upon the offset retrieved by end user 74 from virtual object anchor 54 at location B. End user 74's relative location to virtual object anchor 54 is captured with sensors of end user 74's head mounted display 32 and/or with sensors of virtual object anchor 54, and then stored in virtual object anchor 54 and virtual object anchor database 68. By knowing the relative position of end user 74 at location B, head mounted display 32 at location A is able to create a virtual person within a clear visor 76 that shows the virtual position of end user 74 to the left of virtual object 70. In summary, virtual object 70 is presented so that both end users 72 and 74 see the same object oriented in the same manner. End user 72 sees, for instance, a front view of virtual object 70, and end user 74 standing to the left sees the left side view of virtual object 70. End user 72 is provided with intuitive knowledge of end user 74's position relative to virtual object anchor 54 and knows from the relative viewing perspective how end user 74 is viewing the virtual object 70. Based upon this shared viewing of virtual object 70 using the shared offset stored on each virtual object anchor 54, end users 72 and 74 may more readily collaborate through manipulation of virtual object 70.

Figure 4:
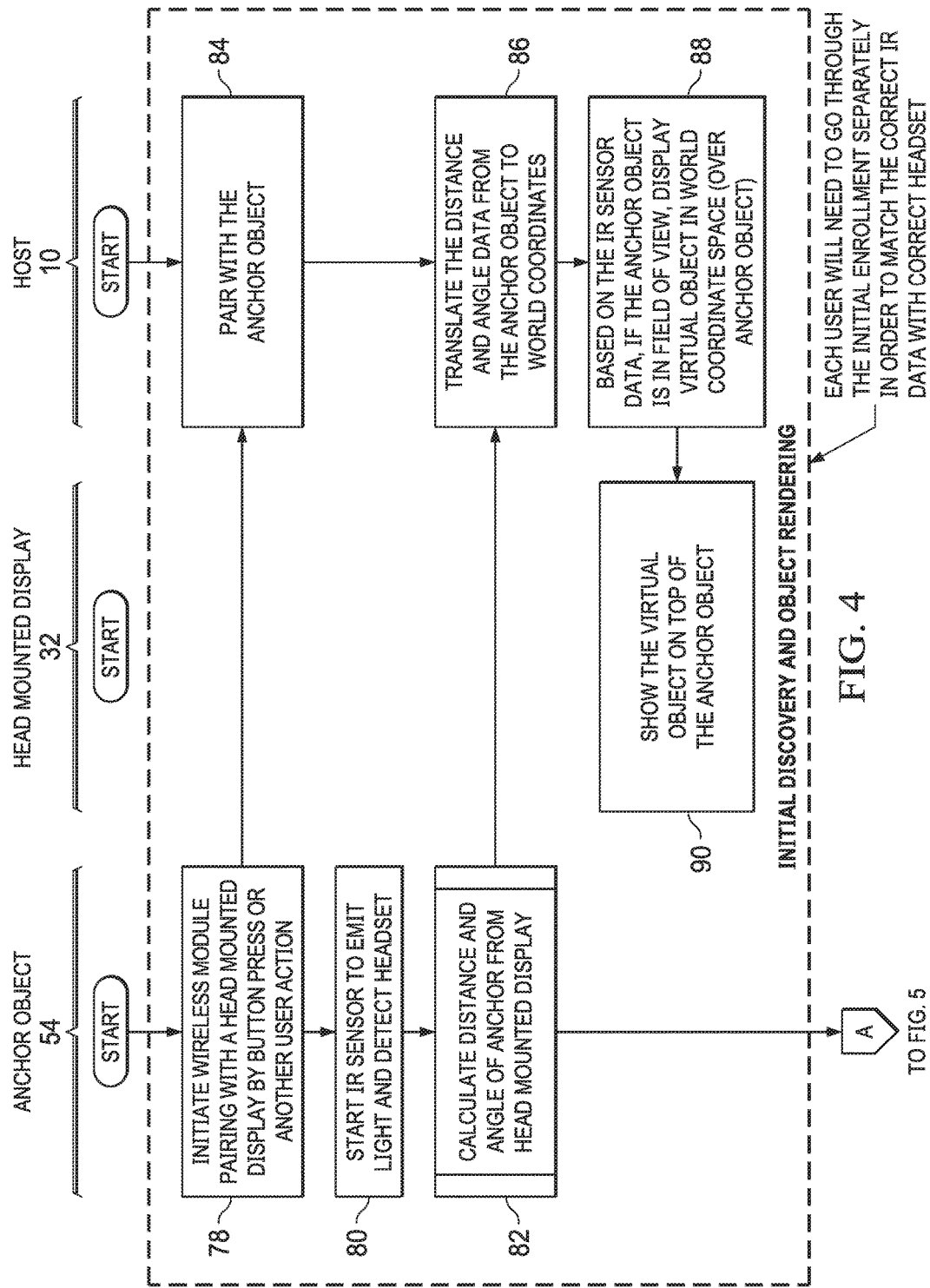
FIG. 4 depicts a flow diagram of a process of an example embodiment for initial discovery of a virtual object anchor and virtual object rendering relative to the virtual object anchor.

Referring now to FIG. 4, a flow diagram depicts a process of an example embodiment for initial discovery of a virtual object anchor and virtual object rendering relative to the virtual object anchor. The process starts at step 78 with initiation of wireless module pairing, such as Bluetooth, between the virtual object anchor 54 and a head mounted display 32, such as by a button press or other user action. Pairing between the head mounted display and virtual object anchor includes a transfer of information that aids in identification of the head mounted display and virtual object anchor by each other. For instance, at step 80 with pairing an infrared sensor initiates to emit light from virtual object anchor 54 that helps virtual object anchor 54 detect the position of head mounted display 32. At step 82, virtual object anchor 82 calculates a distance and angle from virtual object anchor 54 and stores the calculation locally for access by head mounted display 32 and/or other devices that desire to know the spatial relationship of devices in the area of virtual object anchor 54. For example, virtual object anchor 54 in one embodiment continues to track head mounted display 32 as it moves and updates positions stored in virtual object anchor 54. At step 84 pairing through head mounted display 32 is completed with cooperation of a host information handling system 10. At step 86, host information handling system 10 translates the distance and angle data from the virtual object anchor 54 position to real world coordinates, such as true north or an axis derived from a visually distinctive indication of a reference axis on the exterior of virtual object anchor 54, such as an LED. At step 88, based upon the infrared sensor position, if the virtual object is in the field of view of the head mounted display 32, the virtual object is presented in the head mounted display at a location indicated by offset retrieved from virtual object anchor 54 during pairing. For instance, if the position indicated by the offset is over the top of the virtual object anchor 54, at step 90 the virtual object is presented in the head mounted display over virtual object anchor 54. In one example embodiment, the virtual object is placed initially over virtual object anchor 54 using the model database and oriented to the head mounted display until offset information is retrieved from virtual object anchor 54 and applied by the host information handling system.

Figure 5:
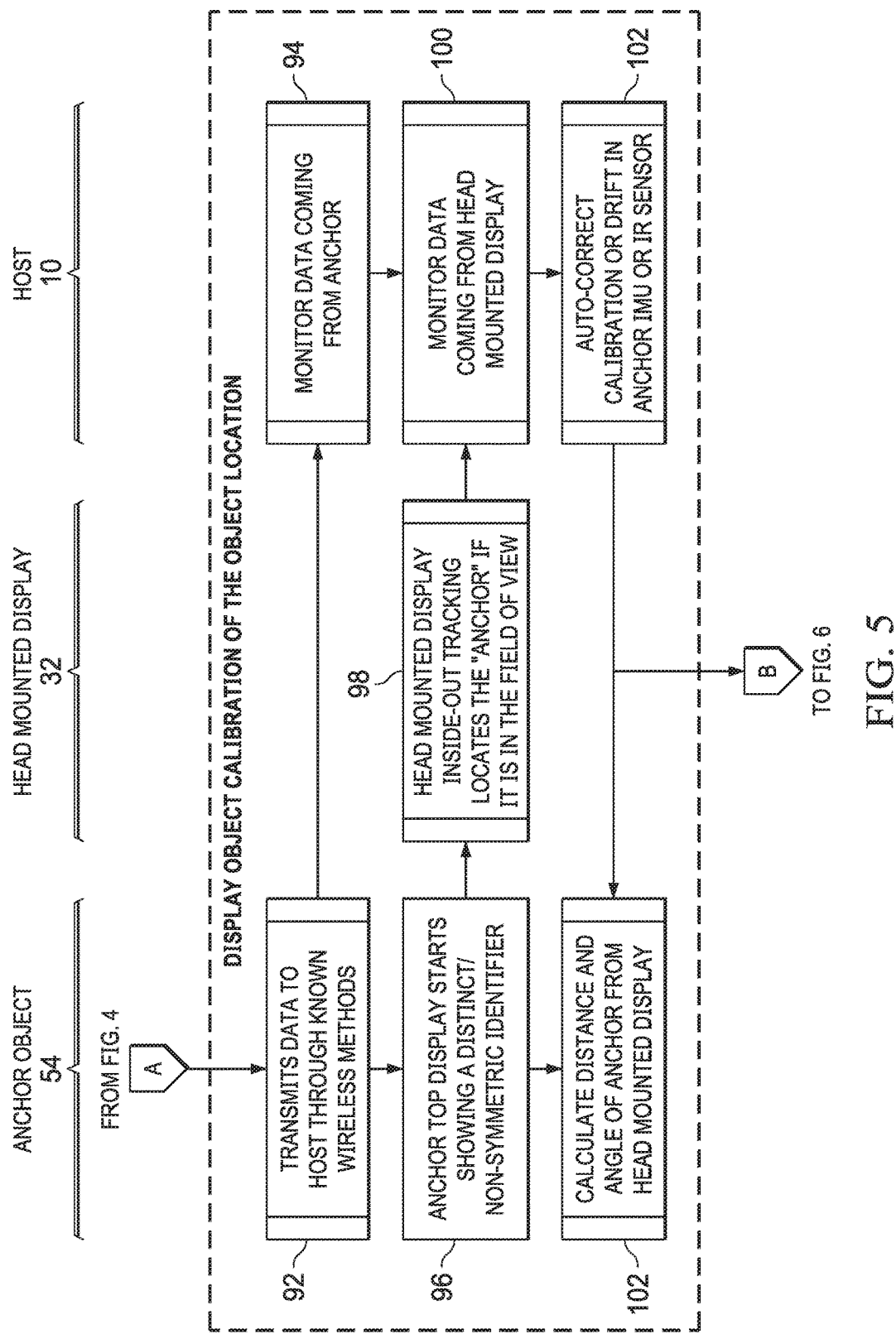
FIG. 5 depicts a flow diagram of a process of an example embodiment for display object calibration of a virtual object location.

Referring now to FIG. 5, a flow diagram depicts a process of an example embodiment for display object calibration of a virtual object location. The process starts at step 92 with transmission of position information from virtual object anchor 54 to host information handling system 10 with conventional wireless or wired communication. At step 94, the host information handling system monitors position data coming from virtual object anchor 54. In the example embodiment, at step 96 virtual object anchor 54's top surface starts to show a distinct and non-symmetrical identifier, such as is distinguishable by a camera of head mounted display 32. At step 98, head mounted display inside-out tracking locates virtual object anchor 54 if virtual object anchor 54 is within the field of view of a sensor of head mounted display 32. At step 100, head mounted display 32 monitors data coming through networked communications and from visual indications presented at virtual object anchor 54. At step 102, the host information handling system applies the position information derived from head mounted display 32 and virtual object anchor 54 to calibrate the position of the virtual object presentation within head mounted display 32. For example an auto-correction calibration or drift in the virtual object anchor inertial monitoring unit or infrared sensor position detection provides a correction that helps head mounted display 32 more precisely present the virtual object. At step 104, virtual object anchor 54 calculates the distance and angle of virtual object anchor 54 to head mounted display 32 to provide a basis for comparing between the resolution of sensors of virtual object anchor 54 and head mounted display 32. Continuous monitoring reduces drift and variation in the presentation of the virtual object as multiple head mounted displays should have the virtual object presented with the same offset at the same position, orientation and scale.

Figure 6:
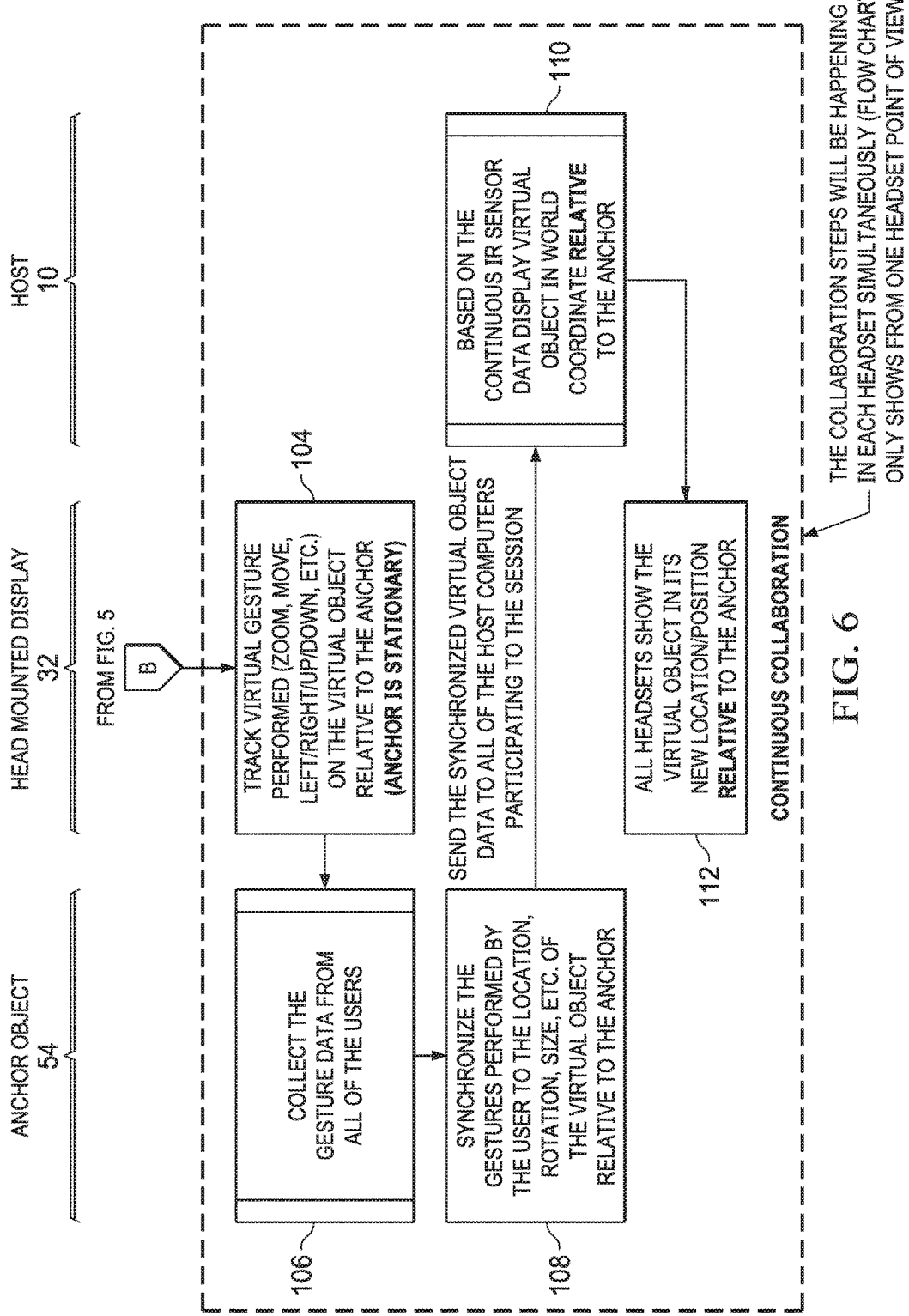
FIG. 6 depicts a flow diagram of a process of an example embodiment for tracking gesture inputs made at a virtual object.

Referring now to FIG. 6, a flow diagram depicts a process of an example embodiment for tracking gesture inputs made at a virtual object. The process starts at step 104 by tracking virtual gestures performed by an end user of head mounted display 32, such as zoom, movement laterally, longitudinally and vertically, and changes to orientation relative to virtual object anchor 54. In one embodiment, an information handling system supporting the head mounted display may alter the virtual object responsive to the gestures or may wait until the offset stored in virtual object anchor 54 is updated. At step 106, virtual object anchor 54 collects gesture data from all of the users that are interacting with the virtual object. In one embodiment, sensors of virtual object anchor 54 may directly detect gestures rather than receiving gesture information from head mounted display gesture detection. At step 108, virtual object anchor 54 synchronizes gestures performed by the end user to the location, rotation and size of the virtual object relative to virtual object anchor 54, such as by resolving multiple gestures by multiple users to generate an appropriate input that is reflected in the offset stored on virtual object anchor 54. The offset that reflects the resolved position, orientation and scale of the virtual object is communicated to all information handling systems involved in the collaboration. At step 110, based upon continuous infrared or other sensor tracking data provided by virtual object anchor 54, information handling system 10 renders the virtual object in the head mounted display to present the virtual object at the location indicated by the offset received from virtual object anchor 54, such as according to a common coordinate system shared with other collaborating information handling systems relative to virtual object anchor 54. At step 112, all head mounted displays 32 participating in the collaboration present the virtual object in its new location/position relative to virtual object anchor 54.

Figure 7:
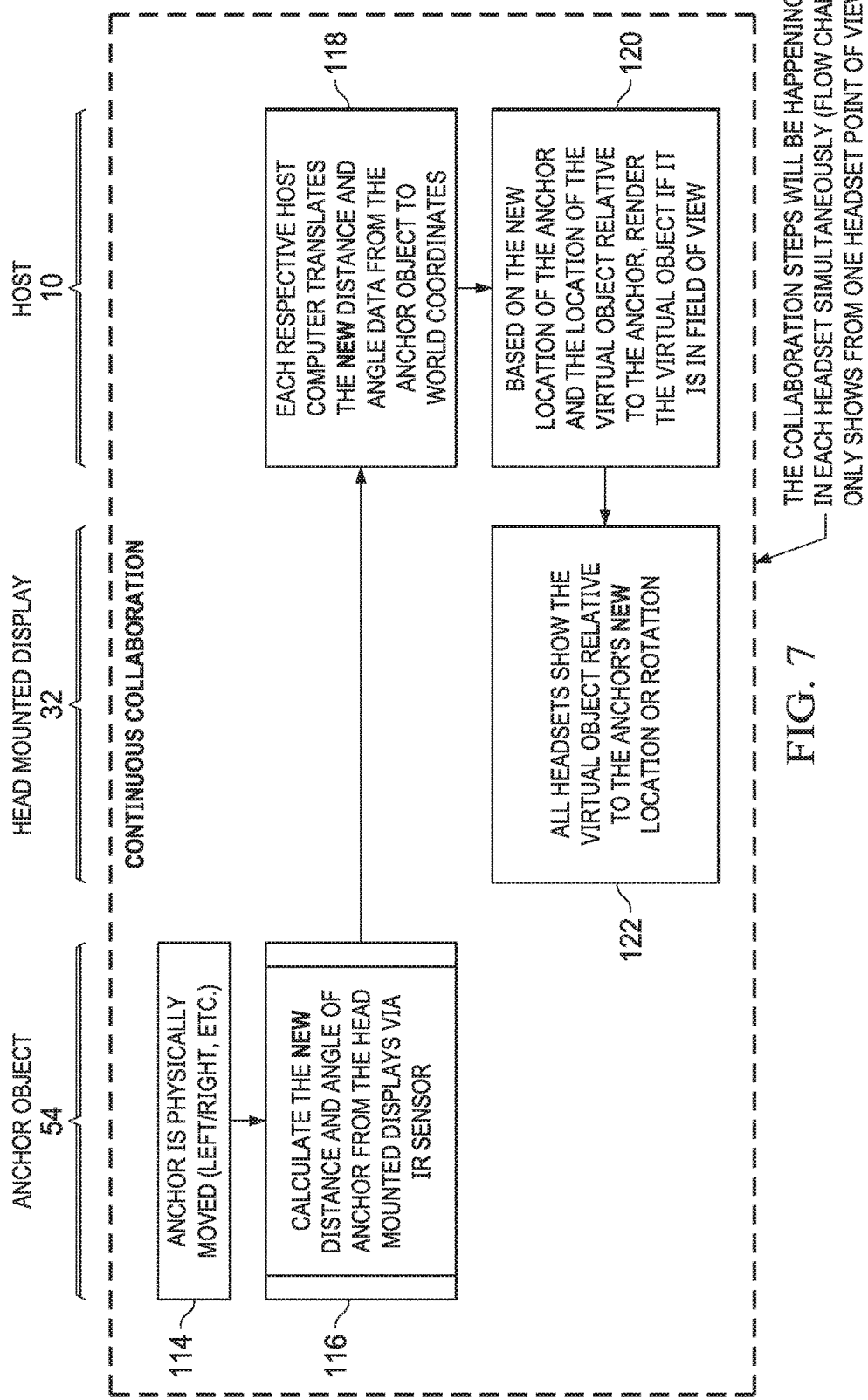
FIG. 7 depicts a flow diagram of a process of an example embodiment for tracking virtual object position changes related to virtual object anchor movement.

Referring now to FIG. 7, a flow diagram depicts a process of an example embodiment for tracking virtual object position changes related to virtual object anchor movement. The process starts at step 114 with virtual object anchor 54 physically moved to a new location, such as to the left or right on a desktop. At step 116, virtual object anchor 54 calculates the new distance and angle of virtual object anchor 54 from head mounted displays 32, such as based upon the infrared sensor. At step 118, each host information handling system 10 translates the new distance and angle information received from virtual object anchor 54 to determine a position of the virtual object in shared coordinates. At step 120, based upon the new location of virtual object anchor 54 and the location of the virtual object relative to virtual object anchor 54, the host information handling systems render the virtual object in the head mounted display when the virtual object is within the field of view of the head mounted display. At step 122, all head mounted displays 32 collaborating through virtual object anchor 54 present the virtual object relative to virtual object anchor 54's new location and orientation.

Although the present invention has been described in detail, it should be understood that various changes, substitutions and alterations can be made hereto without departing from the spirit and scope of the invention as defined by the appended claims.

What is claimed is:

1. An information handling system comprising:
a processor operable to execute instructions to process information;
a memory interfaced with the processor and operable to store the instructions and information;
a graphics processor interfaced with the processor and memory, the graphics processor operable to generate visual information that defines a visual image for presentation at a display;
one or more sensors operable to detect a position of a predetermined virtual object anchor;
a wireless network interface card operable to establish a wireless interface with the predetermined virtual object anchor and to retrieve offset information stored on the virtual object anchor; and
a head mounted display interfaced with the graphics processor and operable to generate a visual image presented as a three dimensional virtual object at a location; and
an augmented reality application executing on the processor to define the location of the three dimensional virtual object by applying the position of the virtual object anchor determined from the sensors and the offset retrieved from the virtual object anchor, the graphics processor interfaced with the augmented reality application and generating the visual information to present the visual image in the head mounted display at the location;
wherein:
the one or more sensors detect end user manipulation of the three dimensional virtual object;
the graphics controller adjusts the appearance of the three dimensional virtual object in response to the detected end user manipulation;
the augmented reality application determines an updated offset from the detected end user manipulation and communicates the updated offset to the virtual object anchor for storage on the virtual object anchor;
the offset comprises position, rotation and scale information;
the augmented reality application receives updated offset information stored at the virtual object anchor by an external information handling system, the updated offset information reflecting end user manipulation of the three dimensional virtual object by an end user of the external information handling system; and the augmented reality application defines an updated location of the three dimensional virtual object that includes the end user manipulation by applying the position of the virtual object anchor determined from the sensors and the updated offset retrieved from the virtual object anchor, the graphics processor interfaced with the augmented reality application and generating the visual information to present the visual image in the head mounted display at the location; and the virtual object anchor beacons a time reference of the most recent change to the offset information and the augmented reality application retrieves the offset information when the time reference of offset information in use by the augmented reality application is older than the beaconed time reference.

2. The information handling system of claim 1 further comprising a virtual object anchor database interfaced through a network with the virtual object anchor and storing the offset information, the augmented reality application retrieving the offset information through the network from the virtual object anchor database in response to an alert communicated from the virtual object anchor.

3. The information handling system of claim 2 wherein the virtual object anchor is at a first location and a second virtual object anchor is at a second location, each virtual object anchor storing the offset information synchronized through the network and virtual object anchor database.

4. The information handling system of claim 1 wherein the virtual object anchor includes one or more sensors operable to detect a position of one or more head mounted displays and the virtual object anchor stores the position of the one or more head mounted displays.

5. The information handling system of claim 4 wherein the augmented reality application retrieves the head mounted display position stored on the virtual object anchor and applies the head mounted display position to define a location of the virtual object.

6. A method for presenting a virtual object at an information handling system head mounted display, the method comprising:
retrieving an offset stored on a virtual object anchor to the information handling system the offset including a time stamp of a most recent update to the offset;
determining a position of the virtual object anchor relative to the head mounted display;
applying the offset and the position of the virtual object anchor to determine a location of a virtual object in the head mounted display;
presenting the virtual object at the location in the head mounted display;
monitoring a wireless signal beacon transmitted from the virtual object anchor, the wireless signal including the time stamp having the time of the most recent update;
comparing the time stamp of the offset applied to present the virtual object with the time stamp of the wireless signal beacon; and
retrieving an updated offset when the time stamp of the offset applied to present the virtual object is older than the time stamp of the wireless signal beacon.

7. The method of claim 6 further comprising:
detecting with sensors integrated in the head mounted display and interfaced with the information handling system a manipulation of the virtual object by a gesture of an end user of the information handling system;
applying the gestures to manipulate the presentation of the virtual object;
determining the updated offset from the gestures at the information handling system;
communicating the updated offset from the information handling system to the virtual object anchor; and
storing the updated offset on the virtual object anchor.

8. The method of claim 6 further comprising:
detecting with sensors of the virtual object anchor manipulation of the virtual object by a gesture at a location associated with the offset;
applying the gesture to update the offset;
storing the updated offset at the virtual object anchor;
communicating the updated offset from the virtual object anchor to the information handling system; and
applying the updated offset to adjust the presentation of the virtual object.

9. The method of claim 8 further comprising:
communicating the updated offset from the virtual object anchor through a network to a second virtual object anchor disposed at a distal location;
storing the offset at the second virtual object anchor;
communicating the updated offset from the second virtual object anchor to a second information handling system located proximate the second virtual object anchor; and
applying the updated offset to adjust the presentation of the virtual object at a second head mounted display associated with the second information handling system.

10. The method of claim 8 further comprising:
communicating the updated offset from the virtual object anchor to a second information handling system proximate to the virtual object anchor; and
applying the updated offset at the second information handling system to adjust presentation of the virtual object in a second head mounted display associated with the second information handling system.

11. The method of claim 6 wherein the offset comprises position, rotation and scale information of the virtual object.

12. The method of claim 6 where in the determining a position of the virtual object anchor relative to the head mounted display further comprises:
detect with sensors of the virtual object anchor a position of the head mounted display;
detect with sensors of the head mounted display a position of the virtual object anchor; and
calibrate the presentation of the virtual object by comparing the virtual object anchor position and the head mounted display position.

13. A virtual object anchor comprising:
a housing;
a processor integrated in the housing and operable to execute instructions to process information;
a memory interfaced with the processor and operable to store the instructions and memory;
a network interface device interfaced with the processor and operable to communicate with external devices; and
non-transitory memory interfaced with the processor and storing the instructions;
wherein the instructions when executed on the processor:
store in the memory a virtual object offset defining a virtual object position, orientation and scale relative to the housing;
communicate the offset through the network interface to plural external devices, the external devices applying the offset to present the virtual object at a location determined from the offset;

beacon as a wireless signal from the network interface device a first time of a most recent update of the virtual object offset;

receive from the network interface device a second time of the most recent update of the virtual object offset; and beacon as the wireless signal from the network interface device the second time of the most recent update of the virtual object offset in the place of the first time of the most recent update of the virtual object offset.

14. The virtual object anchor of claim 13 further comprising an orientation sensor that detects the housing orientation relative to a predetermined coordinate system, the instructions defining the offset based at least in part upon the housing orientation detected by the orientation sensor.

15. The virtual object anchor of claim 13 further comprising:

one or more sensors integrated in the housing and operable to sense gestures by an end user at a location relative to the housing defined by the offset;

wherein the instructions when executed on the processor apply the sensed gestures to update the offset stored in memory to adjust the virtual object position, orientation and scale according to the sensed gestures.

16. The virtual object anchor of claim 15 wherein the network interface device beacons the offset as wireless signals.

* * * * *